No. 723,710. PATENTED MAR. 24, 1903.
H. T. McCUNE.
DENTIST'S SPREADING SCREW ELEVATOR.
APPLICATION FILED DEC. 8, 1902.
NO MODEL.

Witnesses:
D. C. Wilson,
E. E. Potter.

Inventor
Harry T. McCune.
By H. Everett
Attorneys

THE NORRIS PETERS CO., PHOTO-LITHO., WASHINGTON, D. C.

known as

UNITED STATES PATENT OFFICE.

HARRY T. McCUNE, OF BRADDOCK, PENNSYLVANIA.

DENTIST'S SPREADING SCREW-ELEVATOR.

SPECIFICATION forming part of Letters Patent No. 723,710, dated March 24, 1903.

Application filed December 8, 1902. Serial No. 134,298. (No model.)

*To all whom it may concern:*

Be it known that I, HARRY T. MCCUNE, a citizen of the United States of America, residing at Braddock, in the county of Allegheny and State of Pennsylvania, have invented certain new and useful Improvements in Spreading Screw-Elevators, of which the following is a specification, reference being had therein to the accompanying drawings.

This invention relates to certain new and useful improvements in screw-elevators of that type employed in dental surgery for insertion into the root of a tooth in order to extract the root from the gum.

Heretofore and before my invention it has been the general practice to employ a certain type of forceps which grasped the root of the tooth after the gum had been cut away in such a manner as to permit the forceps to be engaged with the tooth. Such practice not only endangered the breaking of the root and the consequent leaving of a portion thereof in the gum, but also damaged the gum to such an extent that it would require a false tooth of greater length than would be the case had the gum not been partly cut away and damaged. With my invention I engage the interior walls of the root and by pressure spread the elevator into firm contact with the walls, so that the root may be readily extracted without requiring any cutting away whatever of the gums.

In describing the invention in detail reference is had to the accompanying drawings, forming a part of this specification, and wherein like numerals of reference indicate like parts throughout the several views, in which—

Figure 1:
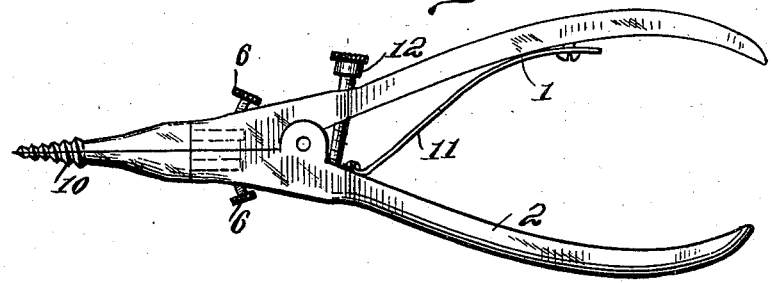
Figure 2:
Figure 3:
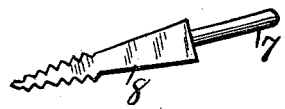
Figure 4:
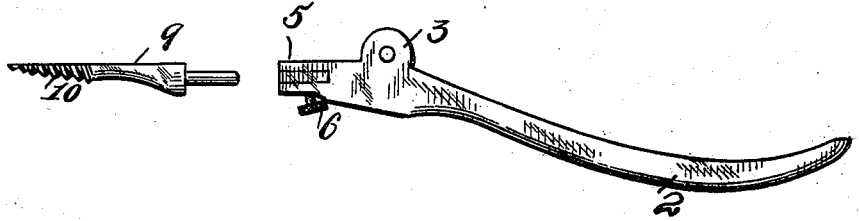

Figure 1 is a detail side elevation of my improved screw-elevator. Fig. 2 is a top plan view of the same. Fig. 3 is a detail perspective view of one of the spreading screws. Fig. 4 is a side elevation of one of the handles and one of the spreading screws, showing the latter detached.

To put my invention into practice, I provide a pair of suitably-shaped handles 1 and 2, one of which is provided with apertured ears or lugs 3 to receive the pivot-pin 4, which passes through said lugs or ears and through the other handle for pivotally securing the two handles together. Each of the handles is provided in its forward end with a socket 5 and carries a set-screw 6, projecting through into the socket, where it engages and impinges upon the shank 7 of the spreading screws 8. Each of these screws has a flat face 9, these flat faces adapted to match together, and when in the engaging position, as shown in Fig. 1 of the drawings, the screw 10 is substantially in the form of the ordinary gimlet-point. A tool is adapted to be inserted into the root of the tooth when in the position shown in Fig. 1 of the drawings, and after the screw has been inserted into the root the handles are pressed together, so as to spread the two screw members and force the screw of each into engagement with the interior walls of the root. The handles are normally spread apart, so as to hold the two screws in engagement by means of the spring 11, and the spreading movement of the screws is limited by the set-screw 12, inserted through one of the handles and engaging the other handle, the spreading movement of the screws being limited by the engagement of the handle 2 with the inner end of the screw 12, the latter acting as a stop to limit the spreading movement. When pressure is relieved upon the handles, the spring 11 forces the screws together, and the root, which has been withdrawn and which is held upon the screw, may be readily removed therefrom, owing to the fact that when the pressure on the handles is relieved the screw members recede from the interior walls of the root. By this device it will be evident that the roots of the tooth may be readily removed without requiring any cutting or damaging of the gums. I preferably make the screw members 8 detachable, as shown, whereby in case one of the members should be broken it may be readily replaced at a comparatively small cost, and also it is to be noted that by making these screw members detachable the handles may be used with other tool members inserted therein in lieu of the screw-elevators.

While I have shown the practical embodiment of my invention, yet it will be noted that various changes may be made in the details of construction without departing from the general spirit of my invention.

Having fully described my invention, what I claim as new, and desire to secure by Letters Patent, is—

1. In a device of the character described, a pair of handles, and screw-elevator members carried by said handles, said members having flat faces matching together, substantially as described.

2. In a device of the character described, a pair of handles, pivoted together, a screw-elevator carried by each handle, and means for limiting the spreading movement of said screw-elevators, substantially as described.

3. In a device of the character described, a pair of spring-pressed handles, removable screw-elevators carried by each handle, and means carried by the handles for limiting the spreading movement of said elevators, substantially as described.

In testimony whereof I affix my signature in the presence of two witnesses.

HARRY T. McCUNE.

Witnesses:
JOHN F. McCUNE,
E. RAY McCUNE.